(12) United States Patent
Jeong et al.

(10) Patent No.: US 8,543,093 B2
(45) Date of Patent: Sep. 24, 2013

(54) AGE-BASED CONTROL OF CONTENT PROVIDED VIA A MOBILE COMMUNICATION TERMINAL

(75) Inventors: Yong Chan Jeong, Suwon-si (KR); Ki Hoa Nam, Uiwang-si (KR)

(73) Assignee: LG Electronics Inc., Seoul (KR)

(*) Notice: Subject to any disclaimer, the term of this patent is extended or adjusted under 35 U.S.C. 154(b) by 1120 days.

(21) Appl. No.: 12/358,680

(22) Filed: Jan. 23, 2009

(65) Prior Publication Data

US 2009/0264101 A1    Oct. 22, 2009

(30) Foreign Application Priority Data

Apr. 21, 2008    (KR) .................. 10-2008-0036603

(51) Int. Cl.
*H04M 1/66*    (2006.01)
*H04N 7/16*    (2011.01)

(52) U.S. Cl.
USPC ................... 455/411; 725/27; 725/28

(58) Field of Classification Search
USPC ........................................... 455/411
See application file for complete search history.

(56) References Cited

U.S. PATENT DOCUMENTS

| | | | |
|---|---|---|---|
| 6,684,240 B1 * | 1/2004 | Goddard | 709/217 |
| 6,922,843 B1 | 7/2005 | Herrington et al. | |
| 7,950,032 B1 * | 5/2011 | Lynch | 725/28 |
| 2003/0154473 A1 | 8/2003 | Shin | |
| 2007/0150918 A1 * | 6/2007 | Carpenter et al. | 725/25 |
| 2008/0256641 A1 * | 10/2008 | Lo | 726/26 |

FOREIGN PATENT DOCUMENTS

| | | |
|---|---|---|
| CN | 1345160 | 4/2002 |
| CN | 1437406 | 8/2003 |
| CN | 1972432 | 5/2007 |
| EP | 1427209 | 6/2004 |
| JP | 2000-152208 | 5/2000 |
| WO | 01/50741 | 7/2001 |

* cited by examiner

*Primary Examiner* — Charles Appiah
*Assistant Examiner* — Natasha Cosme
(74) *Attorney, Agent, or Firm* — Lee, Hong, Degerman, Kang & Waimey

(57) ABSTRACT

A method of updating age restriction settings for content on a mobile communication terminal, the method comprising requesting authentication data, in response to determining that a first age restriction value associated with a first content on the mobile communication terminal is greater than a first threshold value; and providing the first content via the mobile communication terminal and setting the first threshold value equal to the first age restriction value, in response to determining that the authentication data is valid.

16 Claims, 20 Drawing Sheets

FIG. 15

| Viewing reservation/Recording | | | |
|---|---|---|---|
| | CH1 | CH2 | ••• |
| 9~10 | Content 1-a | Content 2-a | Content 3-a |
| 10~11 | Content 1-b | Content 2-b | Content 3-b |
| 11~12 | Content 1-c | Content 2-c | Content 3-c |
| 12~13 | Content 1-d | Content 2-d | Content 3-d |
| ⋮ | 1.Viewing reservation 2.Recording reservation | | |

◄ ► Next

| Menu | OK | Return |

FIG. 16A

| | CH1 | CH2 | ... |
|---|---|---|---|
| Viewing reservation/Recording ||||
| 9~10 | Content 1-a | Content 2-a | Content 3-a |
| 10~11 | Content 1-b | Content 2-b | Content 3-b |
| 11~12 | Viewing reservation for 'content 2-d' on 2nd channel is set. || nt 3-c |
| 12~13 ||| nt 3-d |
| ⋮ | | 2.Recording reservation | |

Next

| Menu | OK | Return |

FIG. 16B

| | CH1 | CH2 | ... |
|---|---|---|---|
| Viewing reservation/Recording ||||
| 9~10 | Content 1-a | Content 2-a | Content 3-a |
| 10 | Viewing reservation for 'content 2-d' on 2nd channel is set. Viewing restricted age '19' for 'content 2-d' to maximum viewing allowable age |||
| 11 ||||
| 12 ||||
| • | | 2.Recording reservation | |

Next

| Menu | OK | Return |

AGE-BASED CONTROL OF CONTENT PROVIDED VIA A MOBILE COMMUNICATION TERMINAL

CROSS-REFERENCE TO RELATED APPLICATIONS

Pursuant to 35 U.S.C. §119(a), this application claims the benefit of earlier filing date and right of priority to Korean Patent Application No. 10-2008-0036603, filed on Apr. 21, 2008, the contents of which are hereby incorporated by reference herein in its entirety.

FIELD OF THE INVENTION

The present invention relates to a terminal, and more particularly, to a terminal and method of controlling broadcasting therein. Although the present invention is suitable for a wide scope of applications, it is particularly suitable for controlling broadcasting of a terminal having a broadcast receiving function.

BACKGROUND

A terminal is a device which may be configured to perform various functions. Examples of such functions include data and voice communications, capturing images and video via a camera, recording audio, playing music files via a speaker system, and displaying images and video on a display. Some terminals include additional functionality which supports game playing, while other terminals are configured as multimedia players. More recently, terminals have been configured to receive broadcast and multicast signals which permit viewing of content such as videos and television programs.

Efforts are ongoing to support and increase the functionality of terminals. Such efforts include software and hardware improvements, as well as changes and improvements in the structural components which form the terminal.

A user inputs authentication information on a broadcast receiving authority, e.g., a parental control PIN code (PPC) to a broadcast receiving terminal. The related art broadcast receiving terminal is able to output a broadcast signal provided from a corresponding channel.

However, as mentioned in the foregoing description, the related art fails to provide a specific scheme for controlling a broadcast viewing per broadcast content provided from a channel.

Therefore, there is a need for controlling content broadcasted over one or more channels.

SUMMARY

A method of updating age restriction settings for content on a mobile communication terminal, the method comprising requesting authentication data, in response to determining that a first age restriction value associated with a first content on the mobile communication terminal is greater than a first threshold value; and providing the first content via the mobile communication terminal and setting the first threshold value equal to the first age restriction value, in response to determining that the authentication data is valid.

The method may further comprise requesting authentication data, in response to determining that a second age restriction value associated with a second content on the mobile communication terminal is greater than the first threshold value; and providing the second content via the mobile communication terminal and setting the first threshold value equal to the second age restriction value, in response to validating the authentication data.

The providing comprises displaying the first content on the mobile communication terminal. The first content may not be provided via the mobile communication terminal, in response to determining that the authentication data is invalid. The first content is otherwise provided via the mobile communication terminal, in response to determining that the first age restriction value associated with the first content is less than or equal to the first threshold value.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 14 to 16B are diagrams of a screen on which a viewing reservation setting process for a second broadcast content in a terminal according to one embodiment of the invention is displayed.

DETAILED DESCRIPTION OF THE EXEMPLARY EMBODIMENTS

Reference will now be made in detail to the preferred embodiments of the invention, examples of which are illustrated in the accompanying drawings. It is to be understood by those of ordinary skill in this technological field that other embodiments may be utilized, and structural, electrical, as well as procedural changes may be made without departing from the scope of the invention. Wherever possible, the same reference numbers will be used throughout the drawings to refer to the same or like parts.

Figure 1:
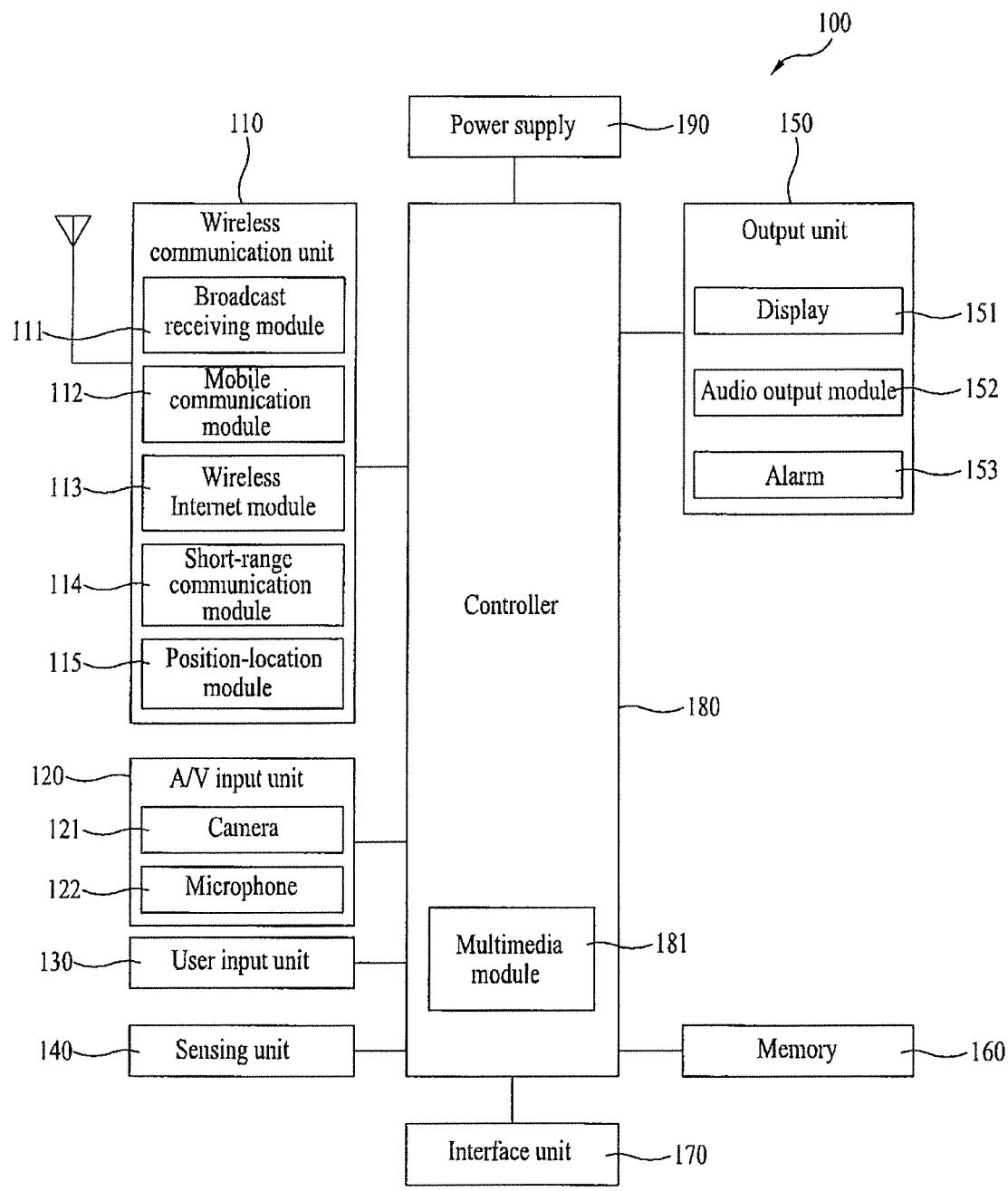
FIG. 1 is a block diagram of a terminal in accordance with an embodiment of the invention.

FIG. 1 is a block diagram of terminal 100 in accordance with an embodiment of the invention. The terminal may be implemented using a variety of different types of terminals. Examples of such terminals include mobile phones, user equipment, smart phones, computers, digital broadcast terminals, personal digital assistants, portable multimedia players (PMP) and navigators. By way of non-limiting example only, further description will be with regard to a terminal. However, such teachings apply equally to other types of terminals. FIG. 1 shows the terminal 100 having various components, but it is understood that implementing all of the illustrated components is not a requirement. Greater or fewer components may alternatively be implemented.

FIG. 1 shows a wireless communication unit 110 configured with several commonly implemented components. For instance, the wireless communication unit 110 typically includes one or more components which permits wireless communication between the terminal 100 and a wireless communication system or network within which the terminal is located.

The broadcast receiving module 11 receives a broadcast signal and/or broadcast associated information from an external broadcast managing entity via a broadcast channel. The broadcast channel may include a satellite channel and a terrestrial channel. The broadcast managing entity refers generally to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of digital multimedia broadcasting (DMB) and electronic service guide (ESG) of digital video broadcast-handheld (DVB-H).

The broadcast signal may be implemented as a TV broadcast signal, a radio broadcast signal, and a data broadcast signal, among others. If desired, the broadcast signal may further include a broadcast signal combined with a TV or radio broadcast signal.

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving of multicast signals is also possible. If desired, data received by the broadcast receiving module 111 may be stored in a suitable device, such as memory 160.

The mobile communication module 112 transmits/receives wireless signals to/from one or more network entities (e.g., base station, Node-B). Such signals may represent audio, video, multimedia, control signaling, and data, among others.

The wireless internet module 113 supports Internet access for the terminal. This module may be internally or externally coupled to the terminal.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

Position-location module 115 identifies or otherwise obtains the location of the terminal. If desired, this module may be implemented using global positioning system (GPS) components which cooperate with associated satellites, network components, and combinations thereof.

Audio/video (A/V) input unit 120 is configured to provide audio or video signal input to the terminal. As shown, the A/V input unit 120 includes a camera 121 and a microphone 122. The camera receives and processes image frames of still pictures or video.

The microphone 122 receives an external audio signal while the portable device is in a particular mode, such as phone call mode, recording mode and voice recognition. This audio signal is processed and converted into digital data. The portable device, and in particular, A/V input unit 120, typically includes assorted noise removing algorithms to remove noise generated in the course of receiving the external audio signal. Data generated by the A/V input unit 120 may be stored in memory 160, utilized by output unit 150, or transmitted via one or more modules of communication unit 110. If desired, two or more microphones and/or cameras may be used.

The user input unit 130 generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touchscreen display (which will be described in more detail below). The sensing unit 140 provides status measurements of various aspects of the terminal. For instance, the sensing unit may detect an open/close status of the terminal, relative positioning of components (e.g., a display and keypad) of the terminal, a change of position of the terminal or a component of the terminal, a presence or absence of user contact with the terminal, orientation or acceleration/deceleration of the terminal. As an example, consider the terminal 100 being configured as a slide-type terminal. In this configuration, the sensing unit 140 may sense whether a sliding portion of the terminal is open or closed. Other examples include the sensing unit 140 sensing the presence or absence of power provided by the power supply 190, the presence or absence of a coupling or other connection between the interface unit 170 and an external device.

The interface unit 170 is often implemented to couple the terminal with external devices. Typical external devices include wired/wireless headphones, external chargers, power supplies, storage devices configured to store data (e.g., audio, video, pictures, etc.), earphones, and microphones, among others. The interface unit 170 may be configured using a wired/wireless data port, a card socket (e.g., for coupling to a memory card and a device equipped with identity module), audio input/output ports and video input/output ports.

In this case, an identity module includes a chip for storing various kinds of information for identifying or authenticating a use authority of the terminal 100. And, the identity module can include one of a user identity module (UIM), a subscriber identity module (SIM), a universal subscriber identity module (USIM), and the like. In particular, the identity module can include a module for identifying or authenticating an authority for a broadcast purchase and/or a broadcast viewing using the terminal 100. And, a device provided with the identity module (hereinafter named 'identity device') can be manufactured into a smart card. Therefore, the identity device can be connected to the terminal 100 via an identity device connecting port.

The output unit 150 generally includes various components which support the output requirements of the terminal. Display 151 is typically implemented to visually display information associated with the terminal 100. For instance, if the terminal is operating in a phone call mode, the display will generally provide a user interface or graphical user interface which includes information associated with placing, conducting, and terminating a phone call. As another example, if the terminal 100 is in a video call mode or a photographing mode, the display 151 may additionally or alternatively display images which are associated with these modes.

One particular implementation includes the display 151 configured as a touch screen working in cooperation with an input device, such as a touchpad. This configuration permits the display to function both as an output device and an input device.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The terminal may include one or more of such displays. An example of a two-display embodiment is one in which one display is configured as an internal display (viewable when the terminal is in an opened position) and a second display configured as an external display (viewable in both the open and closed positions).

FIG. 1 further shows output unit 150 having an audio output module 152 which supports the audio output requirements of the terminal 100. The audio output module is often implemented using one or more speakers, buzzers, other audio producing devices, and combinations thereof. The audio output module functions in various modes including call-receiving mode, call-placing mode, recording mode, voice recognition mode and broadcast reception mode. During operation, the audio output module 152 outputs audio relating to a particular function (e.g., call received, message received, and errors).

The output unit 150 is further shown having an alarm 153, which is commonly used to signal or otherwise identify the occurrence of a particular event associated with the terminal. Typical events include call received, message received and user input received. An example of such output includes the providing of tactile sensations (e.g., vibration) to a user. For instance, the alarm 153 may be configured to vibrate responsive to the terminal receiving a call or message. As another example, vibration is provided by alarm 153 responsive to receiving user input at the terminal, thus providing a tactile feedback mechanism. It is understood that the various output provided by the components of output unit 150 may be separately performed, or such output may be performed using any combination of such components.

The memory 160 is generally used to store various types of data to support the processing, control, and storage requirements of the terminal. Examples of such data include program instructions for applications operating on the terminal, contact data, phonebook data, messages, pictures, video, etc. The memory 160 shown in FIG. 1 may be implemented using any type (or combination) of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The controller 180 typically controls the overall operations of the terminal. For instance, the controller performs the control and processing associated with voice calls, data communications, video calls, camera operations and recording operations. If desired, the controller may include a multimedia module 181 which provides multimedia playback. The multimedia module may be configured as part of the controller 180, or this module may be implemented as a separate component.

The power supply 190 provides power required by the various components for the portable device. The provided power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, memory 160), and executed by a controller or processor (for example, controller 180).

Terminal 100 may be implemented in a variety of different configurations. Examples of such configurations include folder-type, slide-type, bar-type, rotational-type, swing-type and combinations thereof. For clarity, further disclosure will primarily relate to a slide-type terminal. However such teachings apply equally to other types of terminals.

Figure 2A:
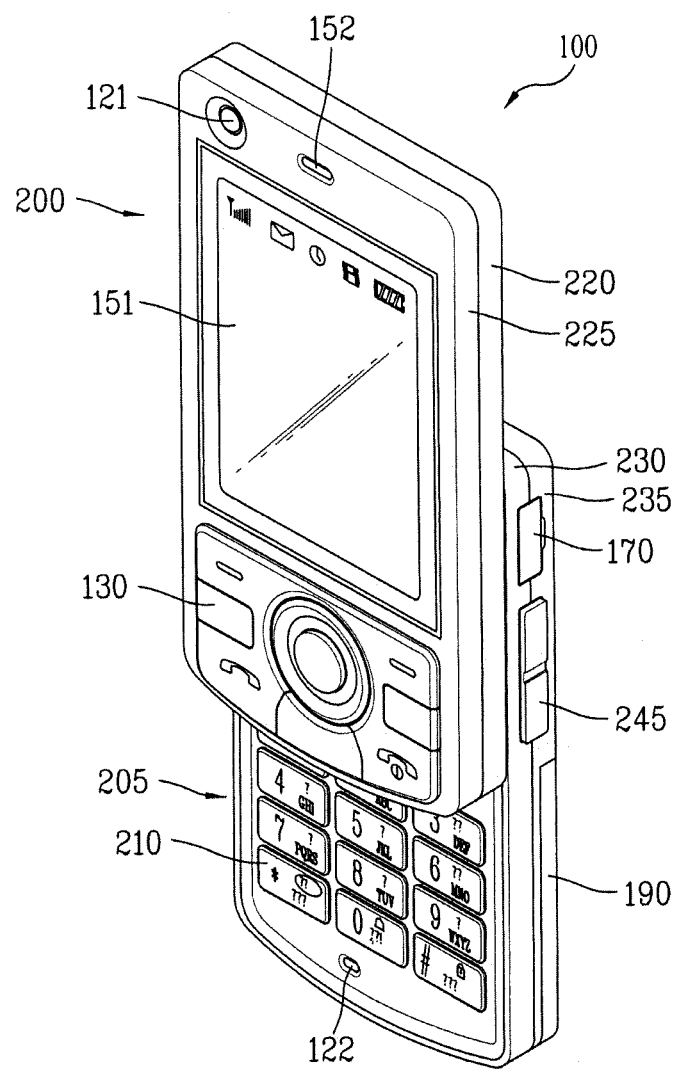
FIG. 2A is a perspective view of a front side of a terminal according to an embodiment of the invention.

FIG. 2A is a perspective view of a front side of a terminal according to an embodiment of the invention. In FIG. 2A, the terminal 100 is shown having a first body 200 configured to slideably cooperate with a second body 205. The user input unit (described in FIG. 1) is implemented using function keys 210 and keypad 215. The function keys 210 are associated with first body 200, and the keypad 215 is associated with second body 205. The keypad includes various keys (e.g., numbers, characters, and symbols) to enable a user to place a call, prepare a text or multimedia message, and otherwise operate the terminal.

The first body 200 slides relative to second body 205 between open and closed positions. In a closed position, the first body is positioned over the second body in such a manner that the keypad 215 is substantially or completely obscured by the first body 200. In the open position, user access to the keypad 215, as well as the display 151 and function keys 210, is possible. The function keys are convenient to a user for entering commands such as start, stop and scroll.

The terminal 100 is operable in either a standby mode (e.g., able to receive a call or message, receive and respond to network control signaling), or an active call mode. Typically, the terminal 100 functions in a standby mode when in the closed position, and an active mode when in the open position. This mode configuration may be changed as required or desired.

The first body 200 is shown formed from a first case 220 and a second case 225, and the second body 205 is shown formed from a first case 230 and a second case 235. The first and second cases are usually formed from a suitably ridge material such as injection molded plastic, or formed using metallic material such as stainless steel (STS) and titanium (Ti).

If desired, one or more intermediate cases may be provided between the first and second cases of one or both of the first and second bodies 200, 205. The first and second bodies 200, 205 are typically sized to receive electronic components necessary to support operation of the terminal 100.

The first body 200 is shown having a camera 121 and audio output unit 152, which is configured as a speaker, positioned relative to the display 151. If desired, the camera 121 may be constructed in such a manner that it can be selectively positioned (e.g., rotated, swiveled, etc.) relative to first body 200.

The function keys 210 are positioned adjacent to a lower side of the display 151. The display 151 is shown implemented as an LCD or OLED. Recall that the display may also be configured as a touchscreen having an underlying touchpad which generates signals responsive to user contact (e.g., finger, stylus, etc.) with the touchscreen.

Second body 205 is shown having a microphone 122 positioned adjacent to keypad 215, and side keys 245, which are one type of a user input unit, positioned along the side of second body 205. Preferably, the side keys 245 may be configured as hot keys, such that the side keys are associated with a particular function of the terminal. An interface unit 170 is shown positioned adjacent to the side keys 245, and a power supply 190 in a form of a battery is located on a lower portion of the second body 205.

Figure 2B:
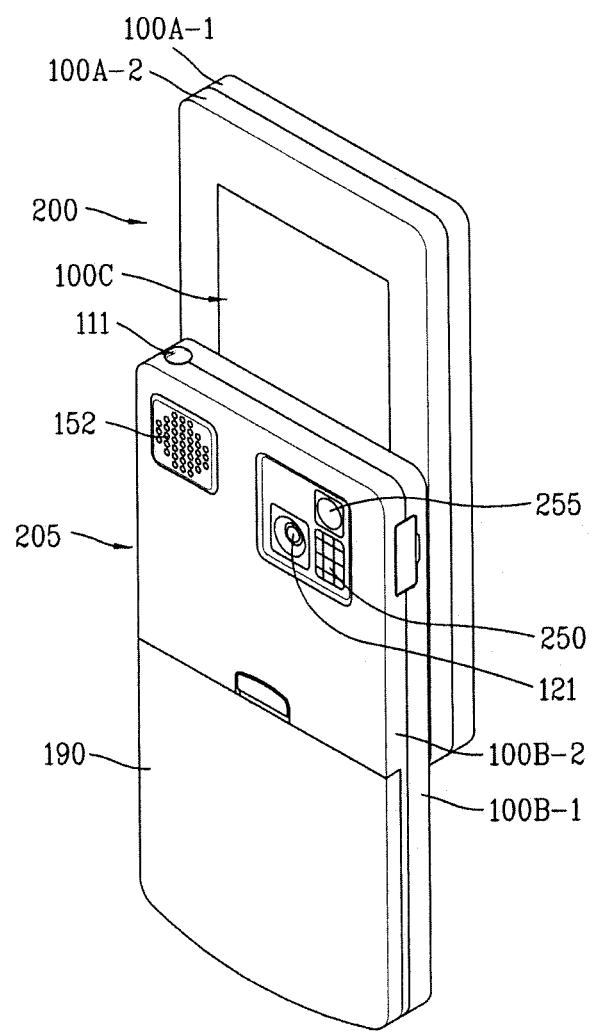
FIG. 2B is a rear view of the terminal shown in FIG. 2A.

FIG. 2B is a rear view of the terminal shown in FIG. 2A. FIG. 2B shows the second body 205 having a camera 121, and an associated flash 250 and mirror 255. The flash operates in conjunction with the camera 121 of the second body. The mirror 255 is useful for assisting a user to position camera 121 in a self-portrait mode. The camera 121 of the second body faces a direction which is opposite to a direction faced by camera 121 of the first body 200 (FIG. 2A). Each of the cameras 121 of the first and second bodies may have the same or different capabilities.

In an embodiment, the camera of the first body 200 operates with a relatively lower resolution than the camera of the second body 205. Such an arrangement works well during a video conference, for example, in which reverse link bandwidth capabilities may be limited. The relatively higher resolution of the camera of the second body 205 (FIG. 2B) is useful for obtaining higher quality pictures for later use or for communicating to others.

The second body 205 also includes an audio output module 152 configured as a speaker, and which is located on an upper side of the second body. If desired, the audio output modules of the first and second bodies 200, 205, may cooperate to provide stereo output. Moreover, either or both of these audio output modules may be configured to operate as a speakerphone.

A broadcast signal receiving antenna 260 is shown located at an upper end of the second body 205. Antenna 260 functions in cooperation with the broadcast receiving module 111 (FIG. 1). If desired, the antenna 260 may be fixed or configured to retract into the second body 205. The rear side of the first body 200 includes slide module 265, which slideably couples with a corresponding slide module located on the front side of the second body 205.

It is understood that the illustrated arrangement of the various components of the first and second bodies 200, 205, may be modified as required or desired. In general, some or all of the components of one body may alternatively be implemented on the other body. In addition, the location and relative positioning of such components are not critical to many embodiments, and as such, the components may be positioned at locations which differ from those shown by the representative figures.

Figure 3A:
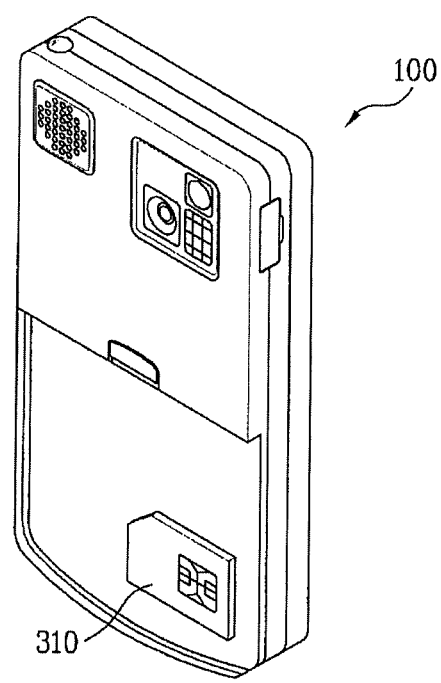
FIG. 3A and FIG. 3B are diagrams for depicting how an identity device is detachably loaded in a terminal according to one embodiment of the invention.
Figure 3B:
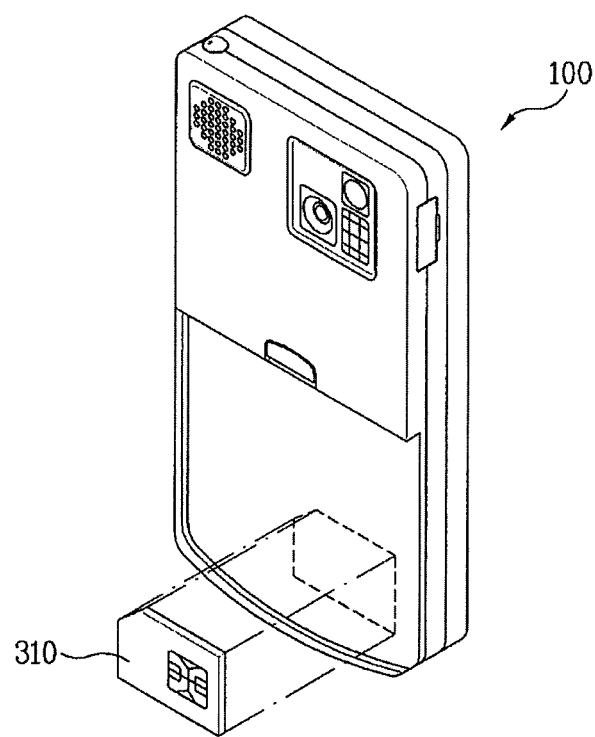

FIG. 3A and FIG. 3B are diagrams for depicting how an identity device is detachably loaded in a terminal according to one embodiment of the invention. In this case, the identity device can include a SIM card.

Referring to FIG. 3A and FIG. 3B, the identity device 310 is detachably provided to the terminal 100. Therefore, an old identity device can be replaced by a new identity device in the terminal 100. The identity device 310 can be loaded in the terminal 100 by being assembled to the interface unit 170. Alternatively, the identity device 310 can be loaded in the terminal 100 by being connected with a connector separately provided for the assembly to the identity device 310.

Besides, a connecting means (not shown in the drawings) for connecting the identity device 310 and the terminal 100 together can be provided to any part of the terminal 100 such a backside, a lateral side, a front side and the like thereof.

The terminal 100 shown in FIGS. 1 to 3B can be configured operable in a communication system capable of transporting data via frames or packets. In this case, the communication system includes a wire/wireless communication system, a satellite based communication system or the like for example.

The terminal 100 of FIGS. 1-3B may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 4:
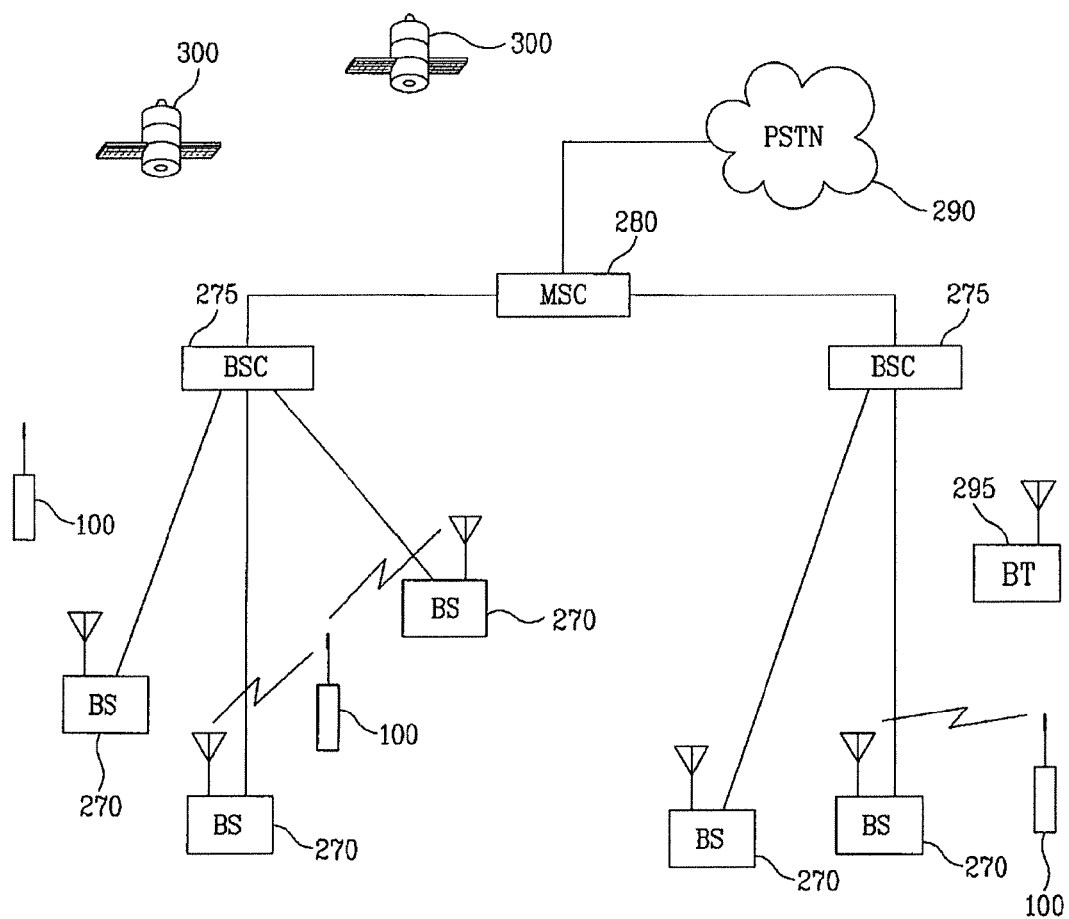
FIG. 4 is a block diagram of a CDMA wireless communication system operable with the terminal of FIGS. 1-3B.

Referring now to FIG. 4, a CDMA wireless communication system is shown having a plurality of terminals 100, a plurality of base stations 270, base station controllers (BSCs) 275, and a mobile switching center (MSC) 280. The MSC 280 is configured to interface with a conventional public switch telephone network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system may include more than two BSCs 275.

Each base station 270 may include one or more sectors, each sector having an omnidirectional antenna or an antenna pointed in a particular direction radially away from the base station 270. Alternatively, each sector may include two antennas for diversity reception. Each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some cases, the term "base station" may be used to refer collectively to a BSC 275, and one or more base stations 270. The base stations may also be denoted "cell sites." Alternatively, individual sectors of a given base station 270 may be referred to as cell sites.

A broadcasting transmitter 295 is shown broadcasting to terminals 100 operating within the system. The broadcast receiving module 111 (FIG. 1) of the portable terminal is typically configured to receive broadcast signals transmitted by the broadcasting transmitter 295. Similar arrangements may be implemented for other types of broadcast and multicast signaling (as discussed above).

FIG. 4 further depicts several global positioning system (GPS) satellites 300. Such satellites facilitate locating the position of some or all of the terminals 100. Two satellites are depicted, but it is understood that useful positioning information may be obtained with greater or fewer satellites. The position-location module 115 (FIG. 1) of the terminal 100 is typically configured to cooperate with the satellites 300 to obtain desired position information. It is to be appreciated that other types of position detection technology, (i.e., location technology that may be used in addition to or instead of GPS location technology) may alternatively be implemented. If desired, some or all of the GPS satellites 300 may alternatively or additionally be configured to provide satellite DMB transmissions.

During typical operation of the wireless communication system, the base stations 270 receive sets of reverse-link signals from various terminals 100. The terminals 100 are engaging in calls, messaging, and other communications. Each reverse-link signal received by a given base station 270 is processed within that base station. The resulting data is forwarded to an associated BSC 275. The BSC provides call resource allocation and mobility management functionality including the orchestration of soft handoffs between base stations 270. The BSCs 275 also route the received data to the MSC 280, which provides additional routing services for interfacing with the PSTN 290. Similarly, the PSTN interfaces with the MSC 280, and the MSC interfaces with the BSCs 275, which in turn control the base stations 270 to transmit sets of forward-link signals to the terminals 100.

For clarity and convenience of the following description, assume that a terminal mentioned in the following description includes at least one of the elements shown in FIG. 1.

In the following description, assume that the identity device 310 or the controller 180 can perform a viewing restricted age management, a user restriction age management, and a maximum viewing allowable age management and a broadcast output control by one of the managements.

A method of controlling broadcasting in a terminal according to one embodiment of the invention is explained with reference to FIG. 5 as follows.

Figure 5:
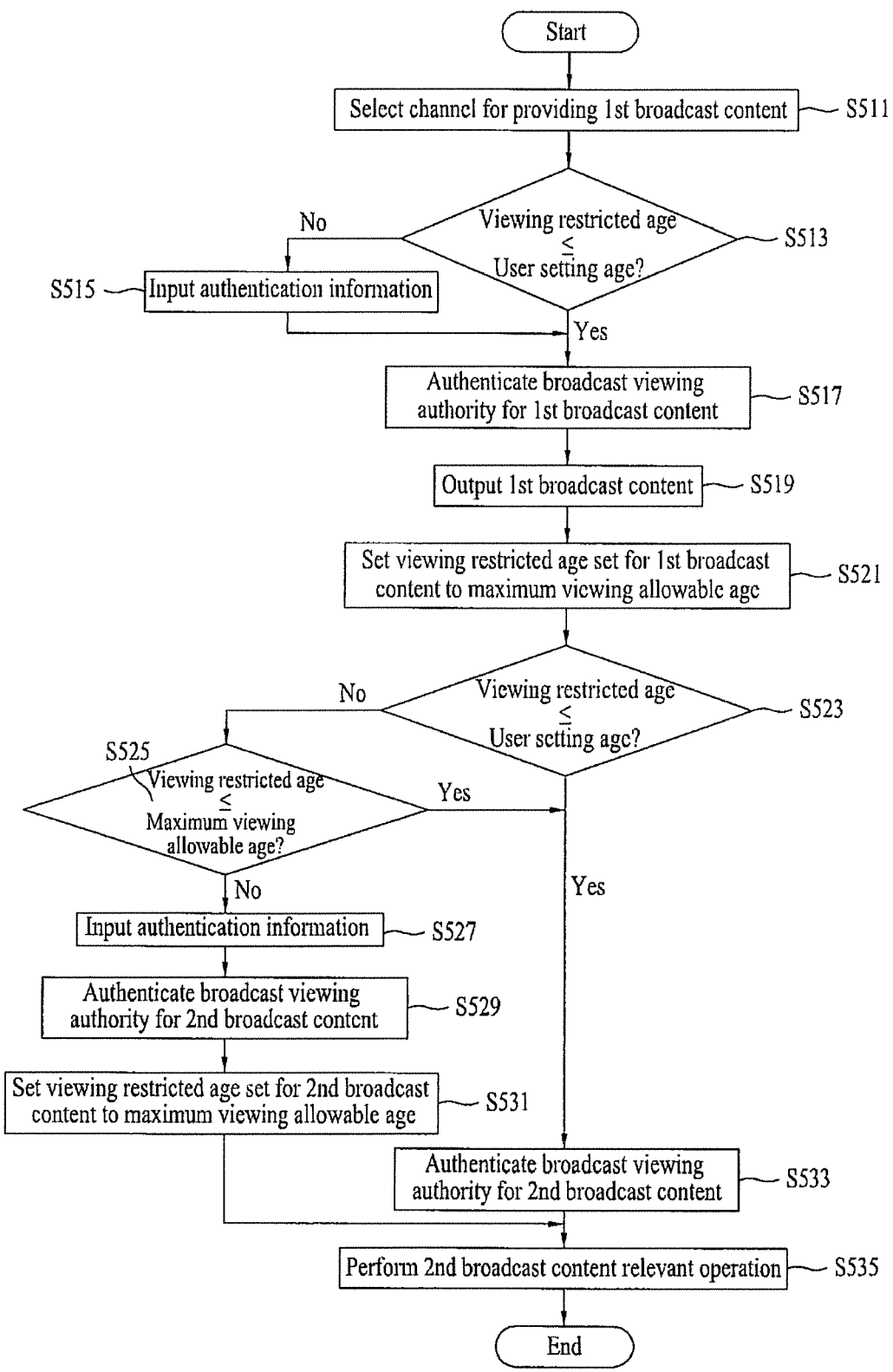
FIG. 5 is a flowchart for a method of controlling broadcasting in a terminal according to one embodiment of the invention.

FIG. 5 is a flowchart for a method of controlling broadcasting in a terminal according to one embodiment of the invention.

Referring to FIG. 5, the terminal 100 enables a user to select a channel for providing a first broadcast content via the user input unit 130 [S511]. In this case, the broadcast content may mean a broadcast program constructed with a broadcast signal provided via channel. A broadcast providing server is able to provide a terminal with a plurality of different broadcast contents to the terminal via at least one or more channels in order of time.

Prior to S511, the terminal 100 is able to receive broadcast relevant information from the broadcast providing server. The terminal is able to obtain channel identification information, per-channel broadcast content information (e.g., title, broadcast time, content information, performer information, etc.), pay/free-of-charge indicating information, viewing restricted age information, and the like from the received broadcast relevant information. For instance, the broadcast relevant information can be provided in format of ESG data of DVB-H or EPG data of DMB.

Hence, the terminal 100 is able to provide per-channel broadcast organization information, a channel list and the like using the channel identification information and the per-channel broadcast content information obtained from the broadcast relevant information.

Figure 6A:
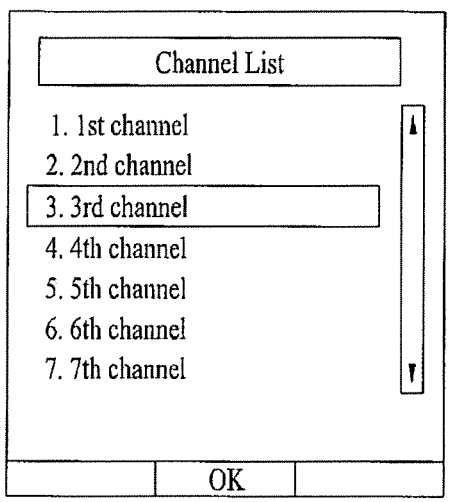
FIG. 6A and FIG. 6B are diagrams for a channel selecting process by a channel entry or switching in a terminal according to one embodiment of the invention.
Figure 6B:
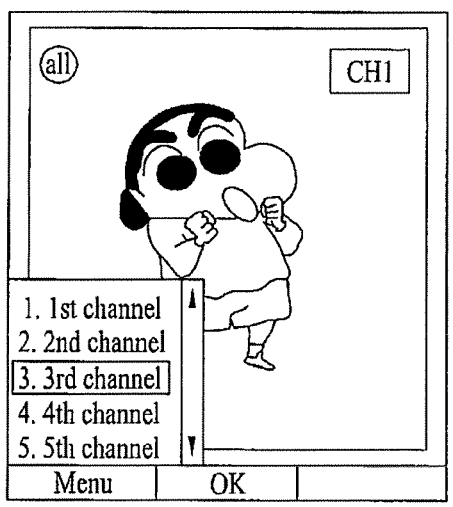

For instance, referring to FIG. 6A and FIG. 6B, in case that a user selects a menu item corresponding to a channel list viewing prior to a broadcast output (FIG. 6A) or in the course of a broadcast output (FIG. 6B), the terminal 100 is able to display a channel list constructed with a plurality of channel names on the screen. Therefore, the user is able to freely select a channel to view. In particular, FIG. 6A shows a channel selection for a channel entry and FIG. 6B shows a channel selection for a channel switching.

In the course of a channel entry attempt or a broadcast output, the terminal 100 can have a channel selected by a channel selection key (e.g., a direction key) manipulation conducted by a user (not shown in the drawings).

The terminal 100 is able to display a channel list containing broadcast organization information (not shown in the drawings). The terminal 100 is able to provide information on a currently provided broadcast content per channel (or previous/current/next broadcast content information), e.g., broadcast content title, broadcast time information, content information and the like. This is to provide a user with information necessary for a channel selection.

Subsequently, the terminal 100 decides whether a viewing restricted age set for the first broadcast content is equal to or smaller than a user setting age [S513]. In some embodiments, the user setting age may be set equivalent to the maximum viewing allowable age, depending on implementation.

For instance, S513 can be performed by the identity device 310 or the controller 180. In some cases, the terminal 100 is able to decide whether the viewing restricted age set for the first broadcast content is smaller than the user setting age.

In this case, the viewing restricted age means a minimum age allowed to view the corresponding broadcast content. The user setting age means a maximum age allowed to view a content using the terminal 100 and can be set by a user. For instance, if the viewing restricted age for the first broadcast content is '15', it may mean that the viewing of the first broadcast content is allowed for users over the age 15. The user setting age '18' may mean that the viewing of the corresponding broadcast content is allowed for users of age 18 or under.

In the deciding step S513, the terminal 100 is able to identify the channel selected in the selecting step S511 using the per-channel identification information obtained from the broadcast relevant information. And, the terminal 100 is able to check the viewing restricted age corresponding to the identified channel from the broadcast relevant information. Hence, the terminal 100 is able to compare the checked viewing restricted age and a preset user setting age to each other.

Figure 7:
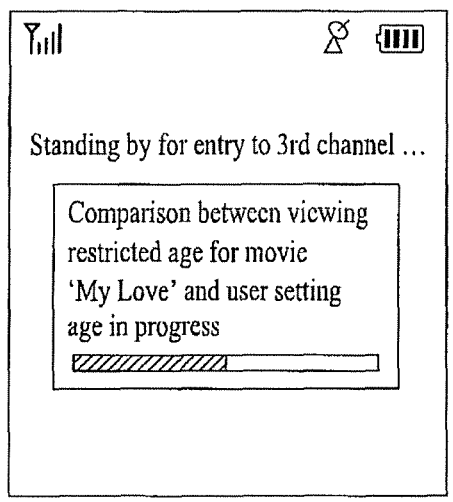
FIG. 7 is a diagram of a screen on which a process for comparing a viewing restricted age and a user setting age to each other for a first broadcast content in a terminal according to one embodiment of the invention is displayed.

For instance, referring to FIG. 7, if a third channel is selected in FIG. 6A (or FIG. 6B), the terminal 100 decides whether a viewing restricted age of a currently provided broadcast content, i.e., the movie 'My Love' is equal to or smaller than a user setting age and is also able to display an indicator for indicating that a deciding step is in progress, i.e., a progressive bar on the screen. In doing so, the terminal 100 is able to display that it is standing by to enter the third channel for providing the movie 'My Love'.

Besides, the terminal 100 is able to use a means for announcing that an operation for comparing the viewing restricted age and the user setting age to each other. In this case, the announcing means can include an icon, an image, a symbol, a text, an animation, a flash, a vibration, an alarm sound, a lamp and/or the like (not shown in the drawing).

Meanwhile, if the preset user setting age does not exist, it is able to omit the above-described deciding step S513. The routine directly goes to an authentication information inputting process S515, which will be explained later, after completion of the selecting step S511.

If the viewing restricted age for the first broadcast content exceeds the user setting age ('no'), the user inputs authentication information for authenticating a broadcast viewing authority to the terminal 100 via the user input unit 130 [S515].

In this case, the authentication information is the information for authenticating a viewing authority for a specific channel or a specific broadcast content and may include a parental control PIN code (PPC) for example. Authentication information management and broadcast output control using the same can be performed by the identity device 310 or the controller 180.

Figure 8:
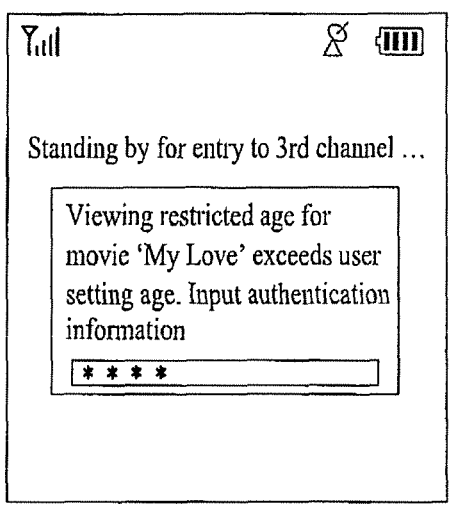
FIG. 8 is a diagram of a screen on which an authentication information inputting process for a first broadcast content in a terminal according to one embodiment of the invention is displayed.

For instance, referring to FIG. 8, if it is decided that the viewing restricted age of the movie 'My Love', which is the broadcast content currently provided from the third channel, exceeds the user setting age, the terminal 100 is able to display authentication information, which is inputted by the user, on an authentication information inputting window whole announcing that the viewing restricted age exceeds the user setting age.

On the other hand, if the viewing restricted age for the first broadcast content is equal to or smaller than the user setting age or the user inputs the authentication information in the inputting process S515, the terminal 100 authenticates a broadcast viewing authority for the first broadcast content [S517]. In this case, the authentication for the broadcast viewing authority can be performed by the identity device 310 or the controller 180.

As the authenticating step S517 authenticates the broadcast viewing authority for the first broadcast content, the terminal 100 outputs the first content via the output unit 150 [S519].

The terminal 100 outputs a video signal constructing the first broadcast content via the display unit 151 and also outputs an audio signal constructing the first broadcast content via the audio output module 152.

As the authenticating process S517 authenticates the broadcast viewing authority for the first broadcast content, the terminal 100 sets the viewing restricted age for the first broadcast content to a maximum viewing allowable age [S521]. In this case, the maximum viewing allowable age is the viewing restricted age for allowing a viewing restricted age set broadcast content to be viewed without having authentication information inputted. And, the maximum viewing allowable age can include a highest viewing restricted age among a plurality of viewing restricted ages for the broadcast contents of which broadcast viewing authorities have been authenticated.

For instance, if a maximum viewing allowable age is '15' and a viewing restricted age set for a broadcast content is '12', a user is able to view the broadcast content without inputting authentication information.

Figure 9:
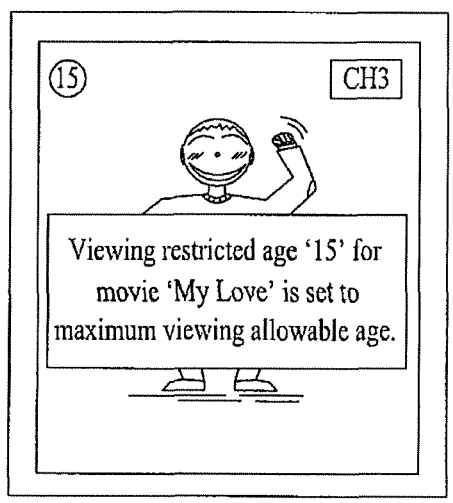
FIG. 9 is a diagram of a screen on which a maximum viewing allowable age setting process for a first broadcast content in a terminal according to one embodiment of the invention is displayed.

For instance, referring to FIG. 9, the terminal 100 sets a viewing age restricted age '15' for a movie 'My Love', which is a broadcast content currently provided from a third channel to a maximum viewing allowable age, and is able to output a text announcing that the viewing restricted age for the movie 'My love' is set to the maximum viewing allowable age. In this case, the terminal 100 is able to output the movie 'My Love' via the output unit 150.

Meanwhile, an icon, an image, a symbol, a text, an animation, a flash, a vibration, an alarm sound, a lamp and/or the like (not shown in the drawing) can be used as a means for announcing the setting of the maximum viewing allowable age.

Alternatively, the setting process S521 can be performed prior to the outputting step S519 by being non-limited to the order shown in FIG. 5.

In one implementation, the terminal 100 decides whether a viewing restricted age set for a second broadcast content exceeds a user setting age [S523].

For instance, the deciding process S523 can be performed by the identity device 310 or the controller 180. In some cases, the terminal 100 is able to decide whether the viewing restricted age set for the second broadcast content is smaller than the user setting age.

In this case, in case that the first and second broadcast contents are provided from the same channel, the second broadcast content means the broadcast content provided after the first broadcast content. As a channel switching is selected in the course of outputting the first broadcast content, if the first and second broadcast contents are provided from different channels, respectively, the second broadcast content may mean the broadcast content that is provided from the switched channel.

Figure 10A:
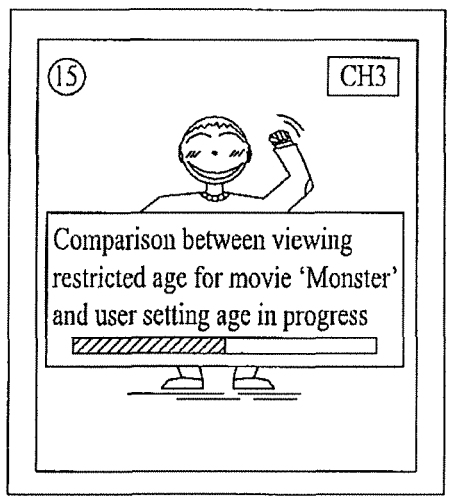
FIG. 10A and FIG. 10B are diagrams of a screen on which a process for comparing a viewing restricted age and a user setting age to each other for a second broadcast content in a terminal according to one embodiment of the invention is displayed.

For instance, referring to FIG. 10A, in case that movies 'My Love' and 'Monster', which are first and second broadcast contents, respectively, are provided from the same channel, the terminal 100 decides whether a viewing restricted age for the movie 'Monster' is equal to or smaller than a user setting age at a timing point ahead of a predetermined time from an end timing point of the movie 'My Love' and is also able to display a text indicating that the deciding step is in progress or an indicator indicating an extent of a progress of the deciding step on the screen. In this case, the terminal 100 is able to keep outputting a broadcast signal provided from a third channel. Instead, if a start timing point of the movie 'Monster' is reached prior to an execution of the deciding step, the terminal 100 can hold a broadcast output until a broadcast viewing authority for the movie 'Monster' is authenticated.

Figure 10B:
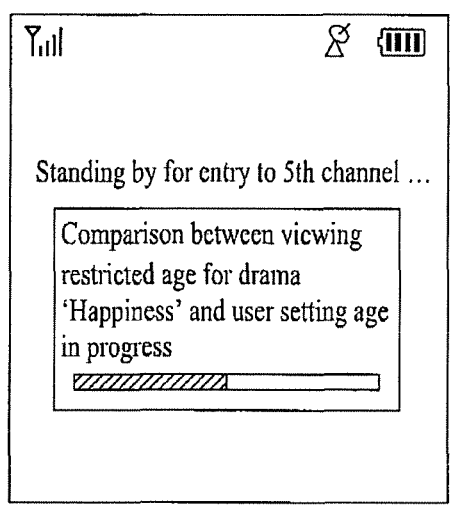

Alternatively, referring to FIG. 10B, in case that a movie 'My Love', which is a first broadcast content, and a drama 'Happiness', which is a second broadcast content, are provided from different channels (third and fifth channels), respectively, the terminal 100 decides whether a viewing restricted age for the drama 'Happiness' is equal to or smaller than a user setting age at a timing point of selecting a switching to a fifth channel and is also able to display a text indicating that the deciding step is in progress or an indicator indicating an extent of a progress of the deciding step on the screen. In this case, the terminal 100 is able to display a text indicating a standby for switching to the fifth channel on the screen.

In one implementation, if a preset user setting age does not exist, the above-mentioned deciding process S523 can be omitted. And, the routine can directly enter a deciding step S515, which will be explained later, after the setting step S521.

If the viewing restricted age for the second broadcast content exceeds the user setting age ('no'), the terminal 100 decides whether the viewing restricted age for the second broadcast content is equal to or smaller than a maximum viewing allowable age [S525].

For instance, the deciding process S525 can be performed by the identity device 310 or the controller 180. In some cases, the terminal 100 can decide whether the viewing restricted age set for the second broadcast content is smaller than the maximum viewing allowable age.

If the first and second broadcast contents are provided from the same channel, the deciding process S525 can be performed at a timing point ahead of a predetermined time from an end timing point of the first broadcast content. If the first and second broadcast contents are provided from different channels, respectively, the deciding process S525 can be performed at a timing point of selecting a switching to the channel for providing the second broadcast content.

Meanwhile, in case that an end timing point of the first broadcast content is substantially modified, the terminal 100 is able to update an end timing point by obtaining information on the modified end timing point of the first broadcast content by one of the following methods.

First of all, according to a first method, the terminal 100 periodically or randomly receives end timing point information of the first broadcast content from an external server via the wireless communication unit 110 and is then able to update an end timing point according to the received end timing point information.

Secondly, according to a second method, if the first broadcast content is a broadcast content of which broadcast use authority is limitedly approved, the terminal 100 is able to decide an end timing point based on a presence or non-presence of validity of the first broadcast content. Therefore, the terminal 100 is able to update a last timing point, at which the validity of the first broadcast content is approved, into an end timing point of the first broadcast content.

Thirdly, according to a fourth method, the terminal 100 is able to receive modification information on broadcast information, and more particularly, modification information on a broadcast end timing point via the wireless communication unit 110. In this case, the modification information, which is separate from broadcast guide information, can contain a content of modified broadcast information to correspond to a modified situation in case that the modified situation of the broadcast information takes place. Therefore, the terminal 100 is able to update an end timing point of the first broadcast content according to the received modification information.

Fourthly, according to a fifth embodiment, in case that a user directly inputs a modified end timing point of the first broadcast content or that modified end timing point information is downloaded from an external server (e.g., a web server, a storage medium, etc.), the terminal 100 is able to modify broadcast guide information to correspond to the inputted or downloaded information.

Figure 11:
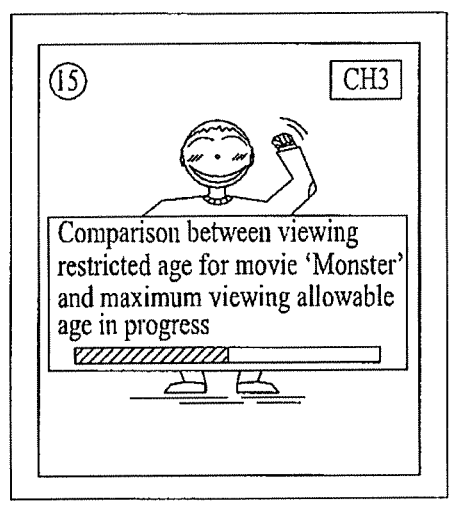
FIG. 11 is a diagram of a screen on which a process for comparing a viewing restricted age and a maximum viewing allowable age to each other for a second broadcast content in a terminal according to one embodiment of the invention is displayed.

For instance, referring to FIG. 11, assuming that a first content of the movie 'My Love' and a second content of the movie 'Monster' are provided from a third channel, the terminal 100 decides whether a viewing restricted age for the movie 'Monster' is equal to or smaller than a maximum viewing allowable age and is also able to display a text announcing that the deciding step is in progress or an indicator indicating a progress extent of the deciding step on the screen.

In this case, the terminal 100 is able to keep outputting a broadcast signal provided from the third channel. Yet, in case that a start timing point of the movie 'Monster' is reached before an execution of the deciding step, the terminal 100 is able to hold a broadcast output until a broadcast viewing authority for the movie 'Monster' is authenticated.

Meanwhile, in case that the first and second broadcast contents are provided from different channels, respectively, the terminal 100 decides whether a viewing restricted age for the second content is equal to or smaller than a maximum viewing allowable age and is also able to display a text announcing that the deciding step is in progress or an indicator indicating a progress extent of the deciding step on the screen. In this case, the terminal 100 is able to announce that a switching to the channel for providing the second content is in progress (not shown in the drawing).

If the viewing restricted age for the second content exceeds the maximum viewing allowable age, authentication information is inputted to the terminal 100 by a user via the user input unit 130 [S527].

Figure 12:
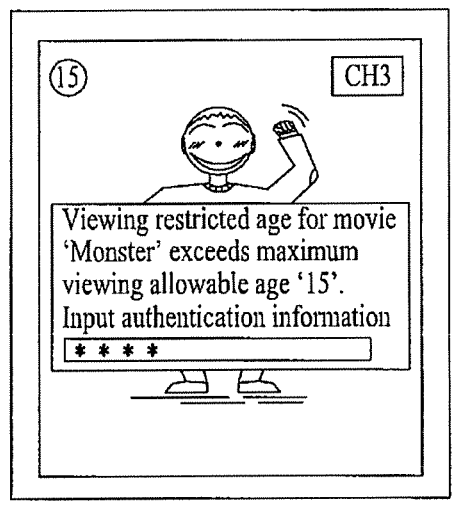
FIG. 12 is a diagram of a screen on which an authentication information inputting process for a second broadcast content in a terminal according to one embodiment of the invention is displayed.

For instance, referring to FIG. 12, if a viewing restricted age for the movie 'Monster', which is the second broadcast content, exceeds a maximum viewing allowable age, the terminal 100 announces that the viewing restricted age exceeds the maximum viewing allowable age and is also able to display authentication information inputted by a user on an authentication information inputting window.

Subsequently, as the broadcast viewing authority for the second broadcast content is authenticated due to the authentication inputted in the inputting step S527 [S529], the terminal 100 sets the viewing restricted age for the second broadcast content to the maximum viewing allowable age [S529].

Figure 13:
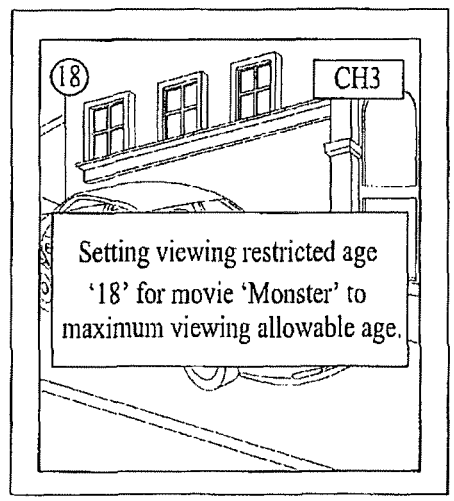
FIG. 13 is a diagram of a screen on which a maximum viewing allowable age setting process for a second broadcast content in a terminal according to one embodiment of the invention is displayed.

For instance, referring to FIG. 13, the terminal 100 sets the viewing restricted age for the movie 'Monster', which is the second broadcast content, to the maximum viewing allowable age and is able to output a text announcing that the viewing restricted age for the movie 'Monster' is set to the maximum viewing allowable age. In this case, the terminal 100 is able to output the movie 'Monster' via the output unit 150. And, the terminal 100 is also able to display an icon indicating the maximum viewing allowable age on a prescribed area of the screen.

If the deciding step S523 decides that the viewing restricted age for the second broadcast content is equal to or smaller than the user setting age or the deciding step S525 decides that the viewing restricted age for the second broadcast content is equal to or smaller than the maximum viewing allowable age, the terminal 100 authenticates the broadcast viewing authority for the second broadcast content [S533]. In this case, the authentication for the broadcast viewing authority can be performed by the identity device 310 or the controller 180.

As the broadcast viewing authority for the second broadcast content is authenticated in the authenticating process S533 or S529, the terminal 100 performs operations relevant to the second broadcast content [S535].

First of all, for example of the operations relevant to the second broadcast content, the terminal 100 is able to output the second broadcast content via the output unit 150. For instance, the terminal 100 outputs a video signal constructing the second broadcast content via the display unit 151 and outputs an audio signal constructing the second broadcast content via the audio output module 152.

Secondly, the terminal 100 is able to set a viewing reservation or a recording reservation for the second broadcast content.

Figure 14:
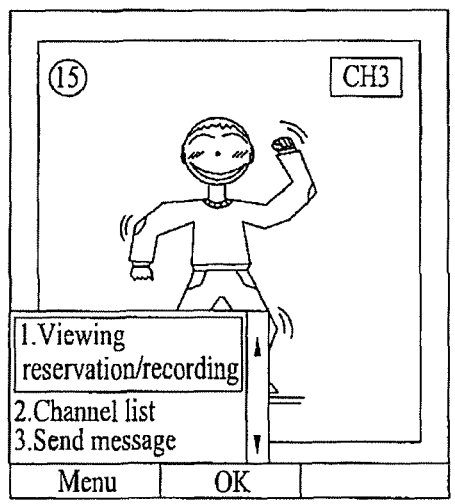

For instance, while the first broadcast content is being outputted, a user is able to select a menu item for a viewing/recording reservation through a menu search [FIG. 14]. The terminal 100 is able to display per-channel broadcast organization information for the viewing/recording reservation, as shown in FIG. 15. Therefore, the user selects a specific broadcast content from the broadcast organization information and is then able to select at least one setting for the selected specific broadcast content from the viewing reservation and the recording reservation.

After a viewing reservation setting has been selected for the specific broadcast content in FIG. 15, in case of deciding that a viewing restricted age for the specific broadcast content is equal to or smaller than a user setting age or deciding that a viewing restricted age for the specific broadcast content is equal to or smaller than a maximum viewing available age, the terminal 100 is able to set a viewing reservation for the specific broadcast content [FIG. 16A].

Alternatively, after a viewing reservation setting has been selected for the specific broadcast content in FIG. 15, if a viewing restricted age of the specific broadcast content is set to a maximum viewing allowable age according to authentication information inputted to the terminal 100, the terminal 100 is able to set a viewing reservation for the specific broadcast content [FIG. 16B].

In FIG. 16A or FI. 16B, the terminal 100 is able to announce that the viewing reservation for the specific broadcast content is set.

Furthermore, in the present invention, when first and second broadcast contents are provided from different channels, respectively, in case that the channel for providing the first broadcast content is switched to the channel for providing the second broadcast content for example, the terminal 100 is able to select whether to maintain the maximum viewing allowable age set by one of the above-mentioned methods. In this case, the selecting operation can be performed in a manner that a user inputs a signal for selecting whether to maintain it to the terminal 100 via the user input unit 130.

Figure 17:
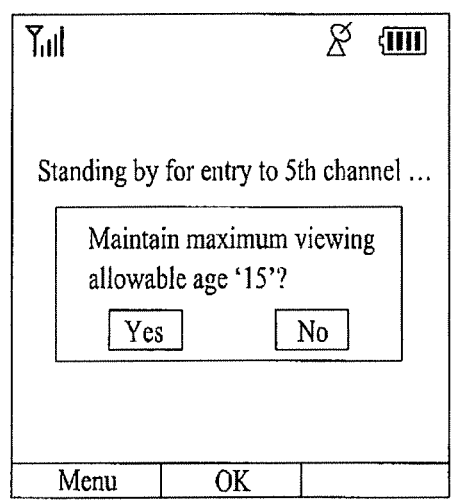
FIG. 17 is a diagram of a screen for selecting 'maintain' of maximum viewing allowable age in case of a channel switching in a terminal according to one embodiment of the invention.

For instance, referring to FIG. 17, in case that a switching to a fifth channel for providing the second broadcast is selected, the terminal 100 is able to display a window enabling a user to select whether to maintain a preset maximum viewing allowable age.

If 'yes' is selected, the terminal 100 maintains the preset maximum viewing allowable age intact. If 'no' is selected, the terminal 100 is able to set the preset maximum viewing allowable age to '0'. Moreover, if 'yes' is selected, the terminal 100 is able to set a new maximum viewing allowable age selected from ages equal to or smaller than the maximum viewing allowable age according to a selection made by a user.

Meanwhile, in a menu mode for a broadcast configuration setting of the terminal 100, whether to maintain a preset maximum viewing allowable age can be selected in advance in case of a channel switching, a broadcast mode end or a broadcast mode entry (not shown in the drawing).

In the present invention, in case of a broadcast mode end or entry, the terminal 100 is able to select whether to maintain the maximum viewing allowable age set by one of the above-mentioned methods. In this case, the corresponding selecting operation can be performed if a user inputs a signal for selecting whether to maintain it via the user input unit 130.

Figure 18A:
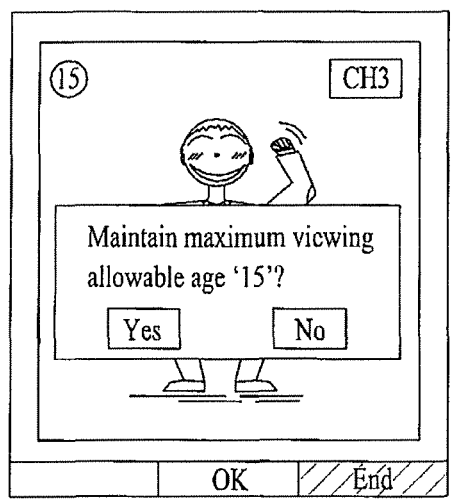
FIG. 18A is a diagram of a screen for selecting 'maintain' of maximum viewing allowable age in case of terminating a broadcast mode in a terminal according to one embodiment of the invention.

For instance, referring to FIG. 18A, in case that a broadcast mode end signal is inputted in the course of outputting a broadcast signal, the terminal 100 is able to display a window enabling a user to select whether to maintain the preset maximum viewing allowable age intact.

Figure 18B:
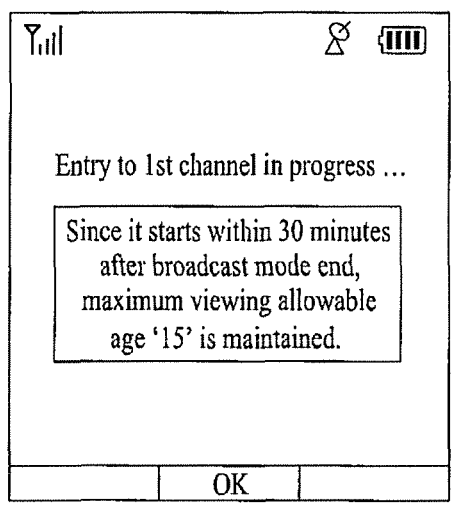
FIG. 18B is a diagram of a screen for a setting of a maximum viewing allowable age in case of re-entry after broadcast mode termination in a terminal according to one embodiment of the invention.

Alternatively, referring to FIG. 18B, if re-entering a broadcast mode within a predetermined time after termination of the broadcast mode, the terminal 100 is able to maintain the preset maximum viewing allowable age regardless of whether a user inputs a signal for selecting whether to maintain the preset maximum viewing allowable age or not.

Figure 19:
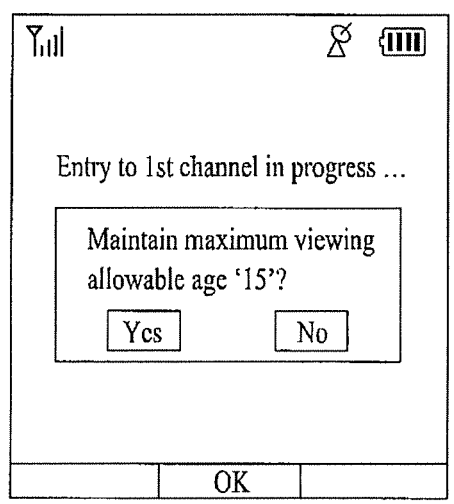
FIG. 19 is a diagram of a screen for selecting 'maintain' of maximum viewing allowable age in case of a broadcast mode entry in a terminal according to one embodiment of the invention.

Alternatively, referring to FIG. 19, in case that a broadcast mode is entered, the terminal 100 is able to display a window enabling a user to select whether to maintain the preset maximum viewing allowable age intact.

Moreover, in the present invention, the terminal 100 is able to display a list constructed with at least one or more broadcast contents. In this case, the broadcast content contained in the list can be displayed in a manner of discriminating whether it is equal to or smaller than a maximum viewing allowable age.

For instance, referring to FIG. 20, a user is able to select a menu item for displaying a channel list (hereinafter named 'channel list item') via menu search while the terminal 100 is outputting a corresponding broadcast.

Figure 20:
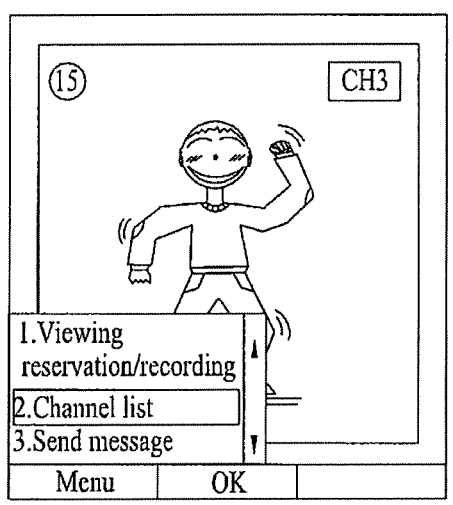
FIGS. 20 to 21B are diagrams of a screen for displaying a list in a terminal according to one embodiment of the invention, in which the list indicates whether each broadcast content is suitable for a maximum viewing allowable age.
Figure 21A:
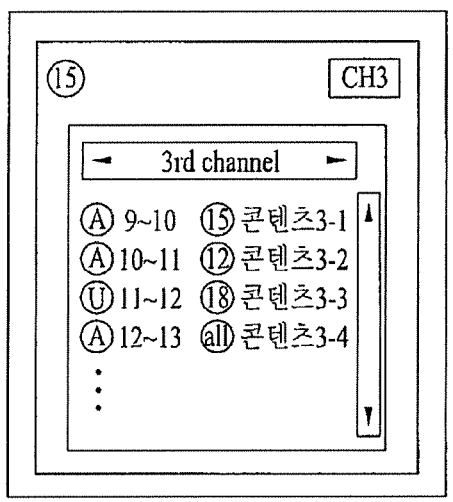

In FIG. 20, as the channel list item is selected, the terminal 100 displays a list constructed with broadcast contents provided on the respective channels in a manner of displaying a viewing restricted age per broadcast content and whether each of the broadcast contents is equal to or smaller than a maximum viewing allowable age [FIG. 21A]. For instance, if it is equal to or smaller than the maximum viewing allowable age, the terminal 100 is able to display 'available'. If it exceeds the maximum viewing allowable age, the terminal 100 is able to display 'unavailable'.

Figure 21B:
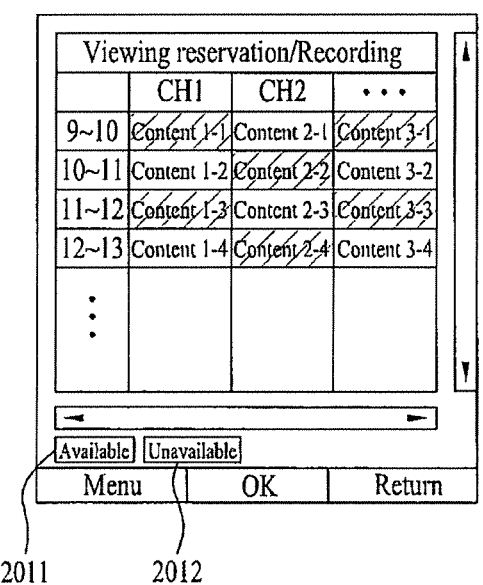

If the channel list item is selected in FIG. 20, the terminal 100 is able to display broadcast organization information indicating whether each broadcast content is equal to or smaller than a maximum viewing available age [FIG. 21B]. For instance, whether each broadcast content is equal to or smaller than a maximum viewing available age can be displayed to be discriminated in a manner of differentiating a background pattern, a shade, a brightness, a color, a font/size and/or the like.

Moreover, the terminal 100 is able to display a list constructed with broadcast contents under or above a maximum viewing available age only according to a selection made by a user (not shown in the drawing).

The above-described present invention is applicable to a terminal supporting at least one broadcasting technology or at least one broadcasting service provider. Therefore, the present invention is applicable to channels belonging to different broadcasting technologies (or broadcasting service providers) as well as the same broadcast technology (or broadcasting service provider).

According to one embodiment of the present invention, the above-described broadcasting control method of the terminal can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the terminal 100.

Accordingly, the present invention provides the following effects and/or advantages.

First of all, the present invention omits a substantially unnecessary operation of inputting authentication information in authenticating a broadcast viewing authority per broadcast content, thereby increasing user's facilitation and convenience.

Secondly, the present invention omits an operation of inputting authentication information for a channel of which viewing restricted age is set equal to or smaller than a maximum viewing allowable age, thereby continuously providing a user with different broadcast contents.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A terminal, comprising:
    a user input unit;
    a wireless communication unit configured to receive a plurality of broadcast contents;
    an output unit configured to output the plurality of broadcast contents; and
    a controller configured to:
        determine whether an authentication condition for outputting a first broadcast content among the plurality of broadcast contents is satisfied; and
        control the output unit to output the first broadcast content in response to determining that the authentication condition is satisfied,
    wherein the authentication condition is determined to be satisfied when a viewing restricted age set for the first broadcast content is equal to or smaller than a user setting age or when the viewing restricted age set for the first broadcast content exceeds the user setting age and the user input unit receives authentication information for authenticating a broadcast viewing authority for the first broadcast content,
    wherein the controller is further configured to set the viewing restricted age set for the first broadcast content as a maximum viewing allowable age in response to determining that the authentication condition is satisfied,
    wherein the maximum viewing allowable age is used for determining whether an authentication condition for outputting a second broadcast content among the plurality of broadcast contents is satisfied, and
    wherein the controller is further configured to select whether to maintain the set maximum viewing allowable age when a broadcast mode entry or a broadcast mode end is performed.

2. The terminal of claim 1, wherein the authentication condition for outputting the second broadcast content is satisfied when a viewing restricted age set for the second broadcast content is equal to or smaller than the user setting age or when the viewing restricted age set for the second broadcast content exceeds the user setting age and the viewing restricted age set for the second broadcast content is equal to or smaller than the maximum viewing allowable age.

3. The terminal of claim 1, wherein the controller is further configured to:
    request the user to input the authentication information when the viewing restricted age set for the second broadcast content exceeds the maximum viewing allowable age; and
    set the viewing restricted age set for the second broadcast content to the maximum viewing allowable age and authenticate a broadcast viewing authority for the second broadcast content when the authentication information is input.

4. The terminal of claim 1, wherein the output unit is further configured to output the second broadcast content based on a control signal from the controller when a broadcast viewing authority for the second broadcast content is authenticated.

5. The terminal of claim 1, wherein the controller is further configured to set at least one selected from the group consisting of a viewing reservation for the second broadcast content and a recording reservation for the second broadcast content based on an input signal received via the user input unit when the controller authenticates the broadcast viewing authority for the second broadcast content.

6. The terminal of claim 1, wherein:
    the output unit comprises a display unit configured to display a list including the plurality of broadcast, contents; and
    the plurality of broadcast contents included in the displayed list is displayed in a discriminating manner based on whether the plurality of broadcast contents is equal to or smaller than the maximum viewing allowable age.

7. The terminal of claim 1, wherein the first and second broadcast contents are provided via either a same broadcast channel or different broadcast channels.

8. The terminal of claim 7, wherein the controller is further configured to select whether to maintain the set maximum viewing allowable age when the first and second broadcast contents are provided via the different broadcast channels.

9. The terminal of claim 7, wherein the controller is further configured to:
    determine whether a viewing restricted age set for the second broadcast content is equal to or smaller than the maximum viewing allowable age at a timing point prior to a predetermined time from an end timing point of the first broadcast content when the first and second broadcast contents are provided via the same broadcast channel; and
    determine whether the viewing restricted age set for the second broadcast content is equal to or smaller than the maximum viewing allowable age at a timing point of selecting a switching to a broadcast channel for providing the second broadcast content when the first and second broadcast contents are provided via the different broadcast channels.

10. The terminal of claim 1, wherein the controller is further configured to select to maintain the set maximum viewing allowable age when the broadcast mode re-entry is performed within a predetermined time from the broadcast mode end.

11. A method of controlling broadcasting in a terminal, the method comprising:
receiving, via a wireless communication unit of the terminal, a plurality of broadcast contents;
determining, via a controller of the terminal, whether an authentication condition for outputting a first broadcast content among the plurality of broadcast contents is satisfied; and
controlling an output unit of the terminal, via the controller, to output the first broadcast content in response to determining that the authentication condition is satisfied, wherein the authentication condition is determined to be satisfied when a viewing restricted age set for the first broadcast content is equal to or smaller than a user setting age or when the viewing restricted age set for the first broadcast content exceeds the user setting age and a user input unit of the terminal receives authentication information for authenticating a broadcast viewing authority for the first broadcast content;
setting, via the controller, the viewing restricted age set for the first broadcast content as a maximum viewing allowable age in response to determining that the authentication condition is satisfied;
determining, via the controller, whether an authentication condition for outputting a second broadcast content among the plurality of broadcast contents is satisfied based on the maximum viewing allowable age; and
selecting, via the controller, whether to maintain the set maximum viewing allowable age when a broadcast mode entry or a broadcast mode end is performed.

12. The method of claim 11, further comprising:
controlling the output unit, via the controller, to output the second broadcast content in response to determining that the authentication condition for outputting the second broadcast content is satisfied,
wherein the authentication condition for outputting the second broadcast content is determined to be satisfied when a viewing restricted age set for the second broadcast content is equal to or smaller than the user setting age or when the viewing restricted age set for the second broadcast content exceeds the user setting age and the viewing restricted age set for the second broadcast content is equal to or smaller than the maximum viewing allowable age.

13. The method of claim 11, further comprising:
receiving authentication information when a viewing restricted age set for the second broadcast content exceeds the maximum viewing allowable age; and
setting the viewing restricted age set for the second broadcast content to the maximum viewing allowable age when the authentication information is received.

14. The method of claim 11, further comprising performing, via the controller, at least one selected from the group consisting of controlling the output unit to output the second broadcast content and performing, via the controller, a viewing or recording reservation for the second broadcast content when the authentication condition for outputting the second broadcast content is satisfied.

15. The method of claim 11, further comprising selecting, via the controller, whether to maintain the set maximum viewing allowable age when the first and second broadcast contents are provided via different broadcast channels.

16. The method of claim 11, wherein:
determining whether the authentication condition for outputting the second broadcast content is satisfied is performed prior to a predetermined time from an end timing point of the first broadcast content when the first and second broadcast contents are provided via a same broadcast channel; and
determining whether the authentication condition for outputting the second broadcast content is satisfied is performed when a selection is received, via the user input unit, for switching to a broadcast channel for providing the second broadcast content when the first and second broadcast contents are provided via different broadcast channels.

* * * * *